(12) United States Patent
Mullen

(10) Patent No.: US 9,316,237 B1
(45) Date of Patent: Apr. 19, 2016

(54) PROPORTIONAL SERVO HYDRAULIC CONTROL VALVE

(71) Applicant: Patrick Michael Mullen, San Juan Bautista, CA (US)

(72) Inventor: Patrick Michael Mullen, San Juan Bautista, CA (US)

( * ) Notice: Subject to any disclaimer, the term of this patent is extended or adjusted under 35 U.S.C. 154(b) by 409 days.

(21) Appl. No.: 13/904,985

(22) Filed: May 29, 2013

(51) Int. Cl.
| | | |
|---|---|---|
| F15B 13/04 | (2006.01) | |
| F15B 13/00 | (2006.01) | |
| F15B 13/044 | (2006.01) | |
| F16K 11/085 | (2006.01) | |

(52) U.S. Cl.
CPC ............. *F15B 13/00* (2013.01); *F15B 13/0406* (2013.01); *F15B 13/0444* (2013.01); *F16K 11/085* (2013.01)

(58) Field of Classification Search
CPC .............................. F01L 33/02; F15B 13/0406
USPC .................. 91/392, 403; 251/129.01, 129.11, 251/129.13
See application file for complete search history.

(56) References Cited

U.S. PATENT DOCUMENTS

| | | | | |
|---|---|---|---|---|
| 3,134,403 A * | 5/1964 | Rudelick | ............. | F16K 11/0856 137/596.15 |
| 3,735,669 A * | 5/1973 | Henke | ..................... | F15B 21/02 91/1 |
| 3,918,493 A * | 11/1975 | Tobias | .................. | F16K 11/072 137/625.23 |
| 4,308,892 A * | 1/1982 | Van Ausdal | ........... | F16K 27/041 137/624.18 |
| 4,442,755 A * | 4/1984 | Rozycki | ................ | F15B 21/125 137/624.13 |
| 4,505,184 A * | 3/1985 | McDonald | ............. | G05B 19/44 137/624.13 |
| 4,794,309 A * | 12/1988 | Saito | ...................... | G05D 17/02 251/129.13 |
| 4,800,924 A * | 1/1989 | Johnson | .............. | F16K 11/0853 137/625.23 |
| 5,954,093 A * | 9/1999 | Leonard | .............. | F15B 13/0406 137/624.13 |
| 6,269,838 B1 * | 8/2001 | Woodworth | ........ | F15B 13/0406 137/625.22 |
| 6,435,205 B1 * | 8/2002 | Hattori | ................ | F15B 13/0814 137/271 |
| 6,594,992 B1 * | 7/2003 | Naito | ...................... | F15B 11/17 137/625.17 |
| 6,755,115 B2 * | 6/2004 | Stoll | .................... | F15B 15/2892 91/363 R |
| 7,401,541 B2 * | 7/2008 | McCarroll | ................ | F15B 9/09 91/392 |

* cited by examiner

*Primary Examiner* — Thomas E Lazo
(74) *Attorney, Agent, or Firm* — Donald R. Boys; Central Coast Patent Agency, Inc.

(57) ABSTRACT

A multi-port servo valve includes a valve plug within a valve body bore, where the plug has multiple holes radially positioned at different axial positions, and the bore has multiple ports, where the valve plug may be controlled to (i) align a first set of plug holes with a first set of bore ports to a first open position, (ii) align a second set of plug holes with a second set of bore ports to a second open position, and (iii) preclude alignment of the plug holes with the bore ports to a valve closed position. The system also includes a servo motor configured to control the position of the valve plug within the bore, and a programmable controller in electrical communication with the servo motor and a sensor associated with the hydraulic cylinder for automated operation.

14 Claims, 7 Drawing Sheets

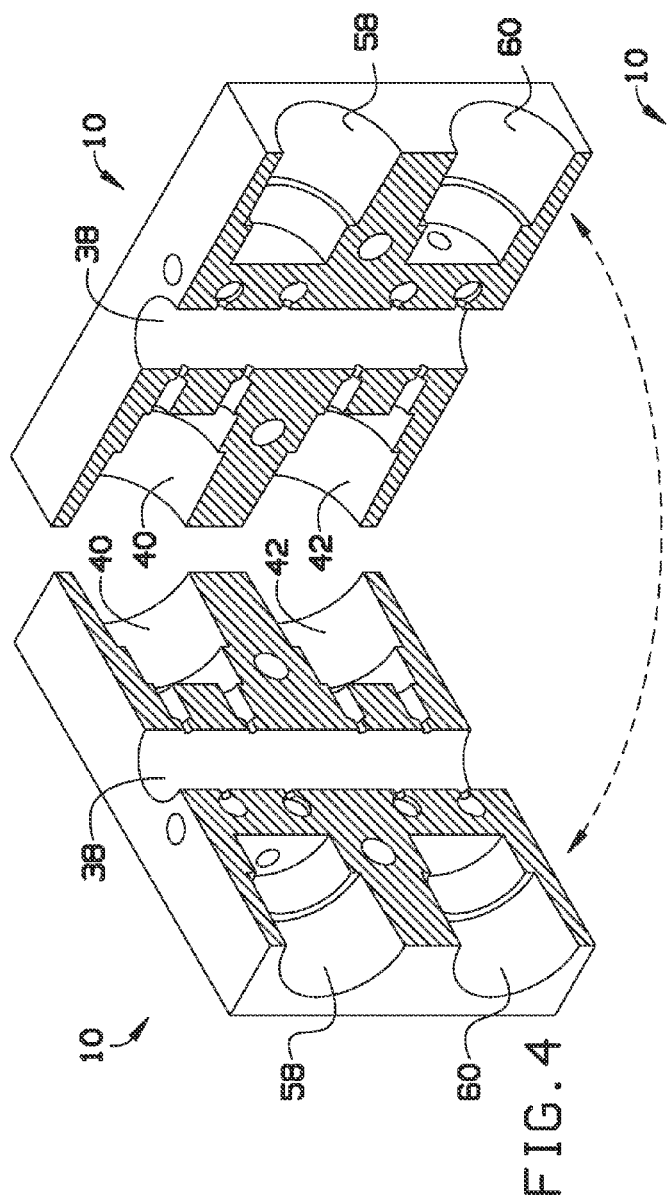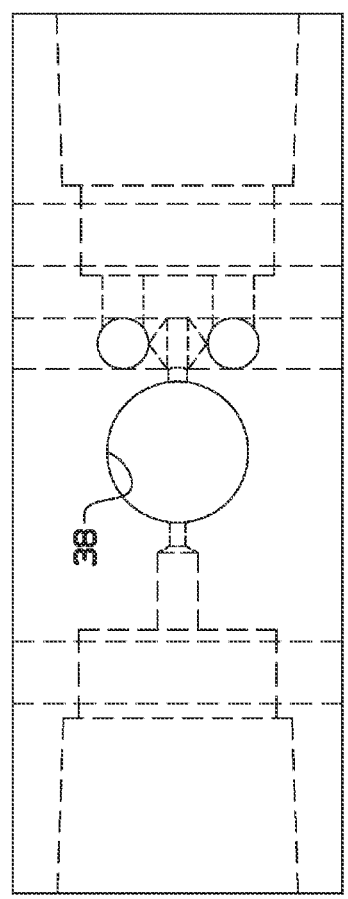

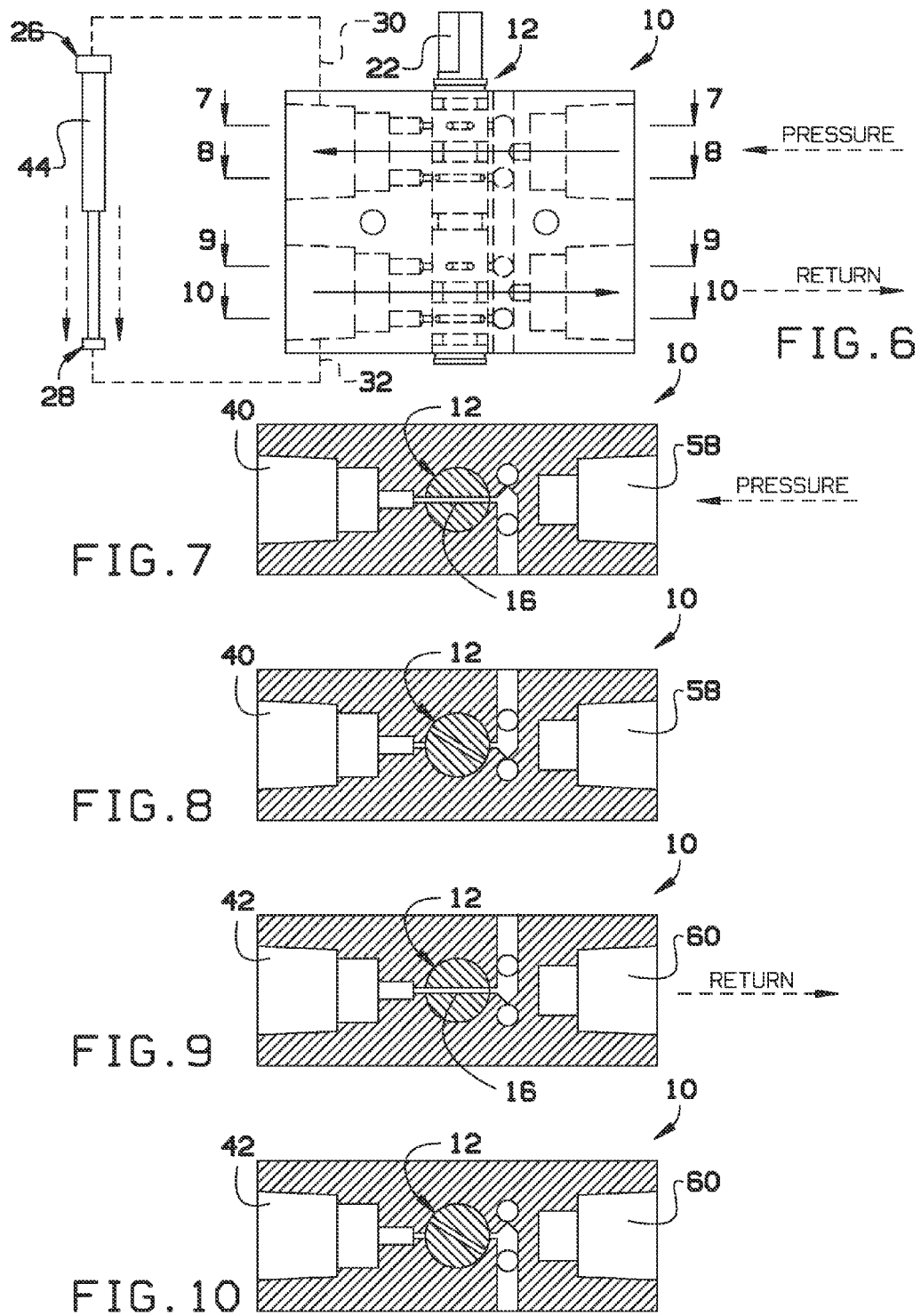

PROPORTIONAL SERVO HYDRAULIC CONTROL VALVE

BACKGROUND

The embodiments herein relate generally to multi-port valve systems for controlling the flow of high-pressure hydraulic fluid to actuate hydraulic cylinders, and more particularly to multi-port valve systems that includes a servomotor and programmable controller for automated operation based upon a feedback loop employing a sensor detecting the position of the piston within the hydraulic cylinder. Of course, the embodiments of the invention herein may also be used for lower pressure fluid systems if so desired.

SUMMARY

A system is provided to control the delivery of high-pressure hydraulic fluid to a hydraulic cylinder where it is desired to control the position of a piston within the hydraulic cylinder over time between a fully extended piston position and a fully contracted piston position. In one embodiment, the system comprises a valve body having four ports for delivering and returning hydraulic fluid between the valve body and a pressure source and for delivering and returning hydraulic fluid between the valve body and a hydraulic cylinder. In embodiment, the system comprises a valve that comprises an elongated valve plug within a valve plug bore, where the plug has a plurality of holes radially positioned therethrough at different axial positions and the valve plug bore has a plurality of ports so that the position of the valve plug may be controlled to (i) align a first set of plug holes with a first set of bore ports to a first valve open position, (ii) align a second set of plug holes with a second set of bore ports to a second valve open position, and (iii) preclude alignment of both the first and second sets of plug holes with the first and second set of bore ports to a valve closed position.

The system preferably comprises a servo motor configured to control the position of the valve plug within the valve plug bore to the first valve open position, the second valve open position and the valve closed position, and a controller in electrical communication with the servo motor and a sensor associated with the hydraulic cylinder, where the sensor is configured to detect the position of the piston relative to the hydraulic cylinder, the controller configured to automatically control the position of the valve plug relative to the valve plug bore based upon feedback from the sensor. Preferably, the controller is configured to be programmable so that it may function to compare the actual linear position of where the piston is at any moment in time with where the desired linear position of the piston is supposed to be at that time and, based upon that comparison, direct the servo motor to position the valve in the first valve open position, the second valve open position or the valve closed position to either bring the actual linear piston position to the desired linear piston position or to leave it in its actual position.

In some embodiments, the valve plug is configured to move rotationally within the valve plug bore, whereas in others, the valve plug is configured to move axially within the valve plug bore. Indeed, in other embodiments, the valve plug may be configured to move both axially and rotationally. It is desired that the servo motor be configured to deliver mechanical energy to the valve to direct movement of the valve plug relative to the valve plug bore.

Embodiments of the present invention preferably include a plurality of pathways, for example, a first and second pathway where the first pathway comprises two ports in fluid communication with the valve plug bore and a port in fluid communication with the first port of the valve body, the second pathway comprising two ports in fluid communication with the valve plug bore and a port in fluid communication with the second port of the valve body, and wherein the valve plug comprises four holes each in communication with either of the first or second pathways so that two of the four holes are in fluid communication with the two ports from the first pathway, and the other two of the four holes are in fluid communication with the two ports from the second pathway. In one mode of operation, when the valve plug is in the first open position, the first of the four holes is in fluid communication with the first and third ports of the valve body and the second of the four holes is in fluid communication with the second and fourth ports of the valve body, while the other third and fourth holes are closed off from any fluid communication. When the valve plug is in the second open position, the third of the four holes is in fluid communication with the first and fourth ports of the valve body and the fourth of the four holes is in fluid communication with the second and third ports of the valve body, while the first and second holes are closed off from any fluid communication. Variations on these embodiments are described below.

BRIEF DESCRIPTION OF THE FIGURES

The detailed description of some embodiments of the invention will be made below with reference to the accompanying figures, wherein like numerals represent corresponding parts of the figures.

FIG. 4 is a cross-sectional perspective view of the valve body of FIG. 3.

FIG. 5 is a top view of the valve body of FIG. 3.

FIGS. 6, 11 and 16 are schematic side views of the valve body of FIG. 3 shown in connection with an example of hydraulic cylinder in a first open position, a closed position, and a second open position, respectively.

FIGS. 7-10, FIGS. 12-15 and FIGS. 17-20 are cross-sectional views of the valve body of FIG. 3 taken through cross-section lines designated in FIGS. 6, 11 and 16, showing the relative position of the valve plug vis-à-vis the valve body when the valve is in a first open position, a closed position, and a second open position, respectively.

DETAILED DESCRIPTION OF CERTAIN EMBODIMENTS

Figure 1:
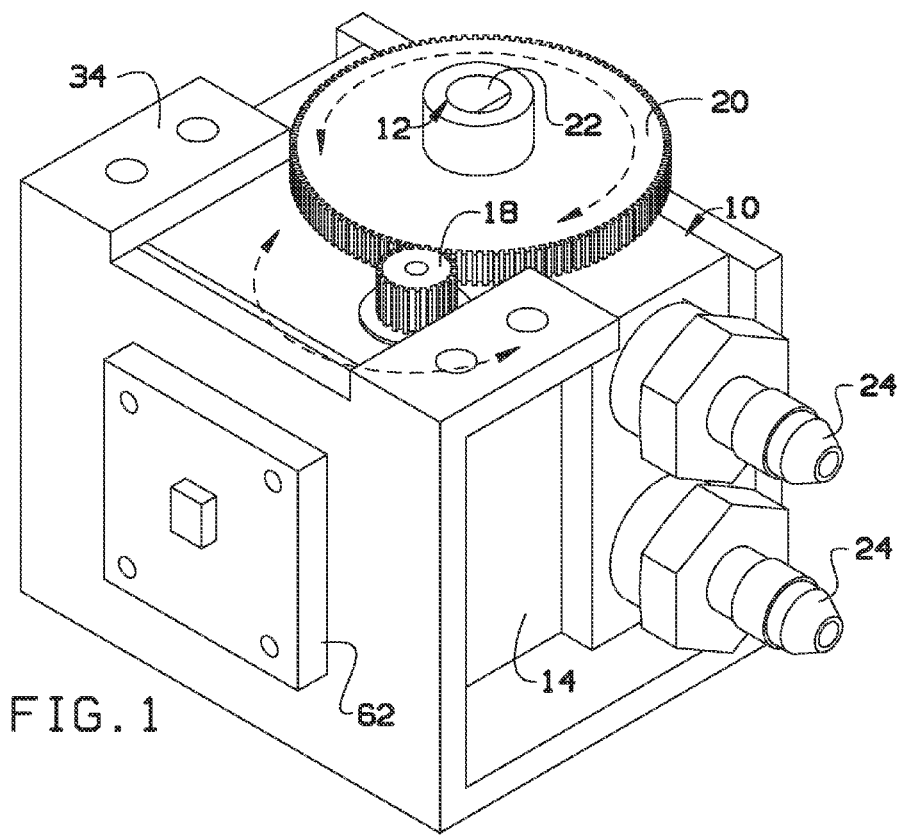
FIG. 1 is a perspective view of one embodiment of the invention.
Figure 2:
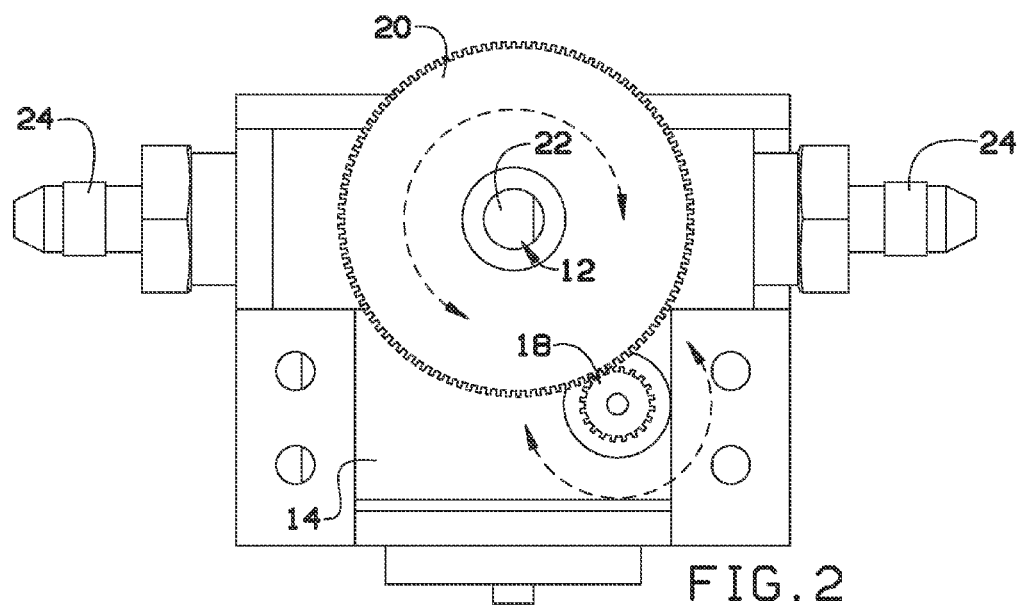
FIG. 2 is a top view of the embodiment of FIG. 1.

By way of example, and referring to FIGS. 1 and 2, one embodiment of the present inventive multi-port valve system 10 comprises a valve 12 and a servo motor 14 within a valve body housing 34. The system comprises a plurality of fluid ports 24 configured for the delivery of fluid to and from the valve system. In the example illustrated herein, there are four ports 24. However, the number of ports, and the arrangement of those ports relative to each other is not limited as shown, but indeed may include more than four ports and may orient the ports to have some being parallel to each other, perpendicular to each other, or any other one of a number of possible configurations within the housing 34.

Figure 3:
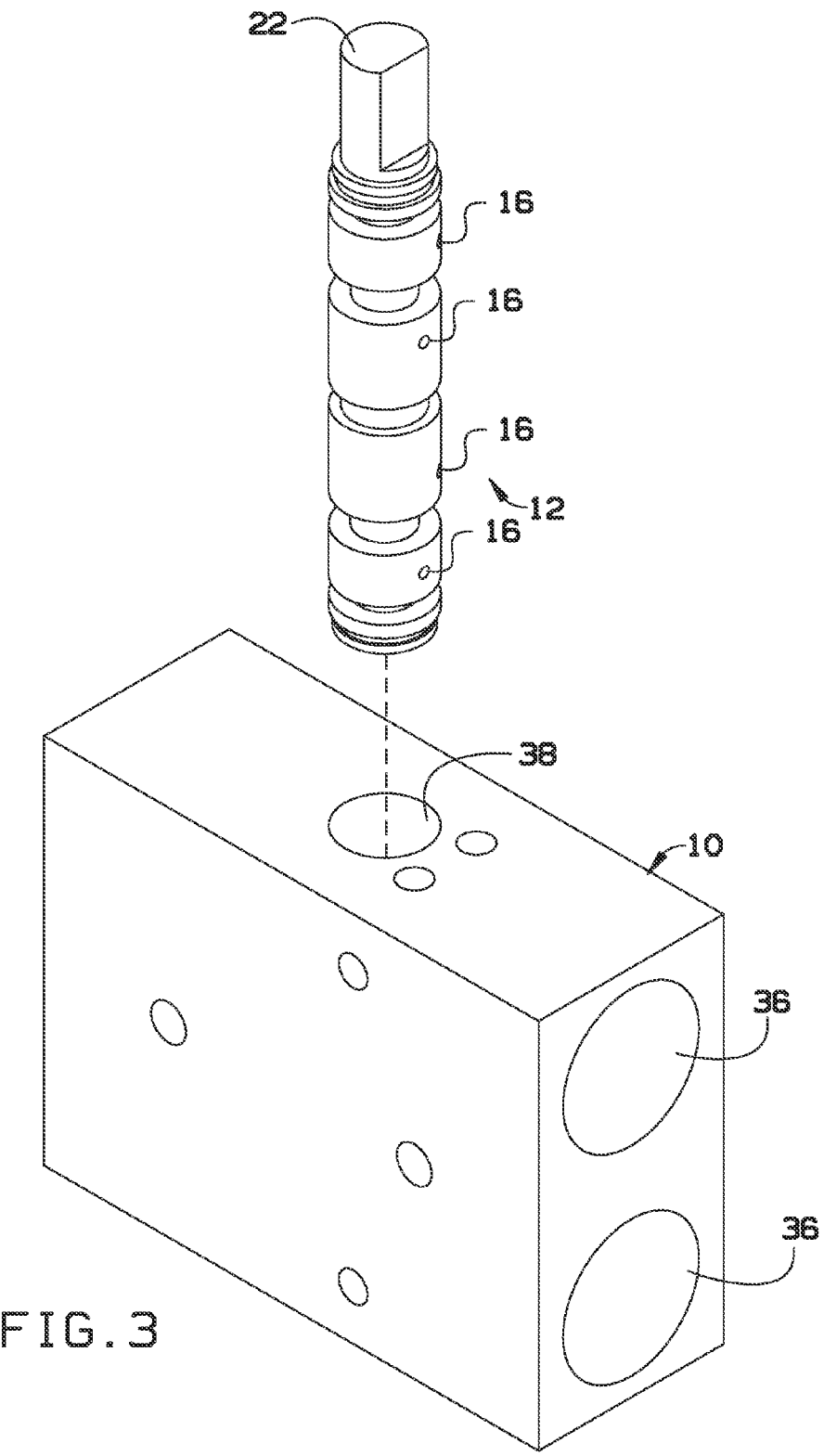
FIG. 3 is an exploded view of the valve plug and valve body of the embodiment of FIG. 1.

Referring to FIG. 3 momentarily, the valve 12 comprises a valve plug 22 configured to be housed within a valve plug bore 38 within the valve body of the multi-port valve system 10. In one embodiment, the valve plug comprises a plurality of holes 16 therethrough, where each of the plurality of holes 16 are spaced axially along the length of the valve plug 22. At least one set of holes 16 is aligned parallel to each other (in this example of embodiment the top hole and the second from the bottom hole), while another set of holes 16 is also aligned parallel to each other (in this example of embodiment the second hole from the top and the bottom hole), but out of alignment with the first set. Of course, the set of holes may be arranged in any number of configurations and radial positions, as may be appreciated further below. And additional holes and/or sets of holes may be employed where additional fluid ports are desired for the valve to control.

With reference back to FIGS. 1 and 2, in this embodiment, the servo motor 14 is configured to have a mechanical output which, in this case, is in the form of a servo gear 18 configured to rotate in clockwise and counterclockwise motion. Servo gear 18 is preferably positioned to be in engagement with valve gear 20 that is affixed to valve plug 22 so that rotation of the servo gear 18 causes rotation of valve gear 20, to drive rotation of valve plug 22. Such rotation of the valve plug 22 causes the first and second holes to come within and without of alignment with fluid pathway ports, as described below.

It should be noted that the radial size and number of teeth in the servo motor gear 18 and the valve gear 20 are set dependent upon the desired control of valve movement and the mechanical output of the servo motor. The larger or smaller the ratio between gears impacts the speed of movement of the valve. In some cases, it may be desired to have very small movement of the valve plug to correspond with fine piston movement within the hydraulic cylinder. In other cases, micro-movement control may not be necessary, so that the gear ratio may be smaller.

Importantly, it should be noted that movement of the valve plug 22 within valve plug bore 38 need not be limited to rotational movement, but indeed may comprise axial movement instead of or in addition to rotational movement. Axial movement may be achieved via a combination of bevel gears, or a rack and pinion arrangement, for example, where the servo motor may drive axial movement of the valve plug. It may also be desired that the valve plug be spring loaded either axially or rotationally where the combination of the servo motor and the force of the spring act to control fine movement of the valve plug relative to the valve plug bore. It is contemplated that a number of possible configurations may be employed to cause the valve plug to bring into alignment certain of the valve plug holes with ports that extend radially outward from the valve plug bore 38, as described further below.

Figure 21:
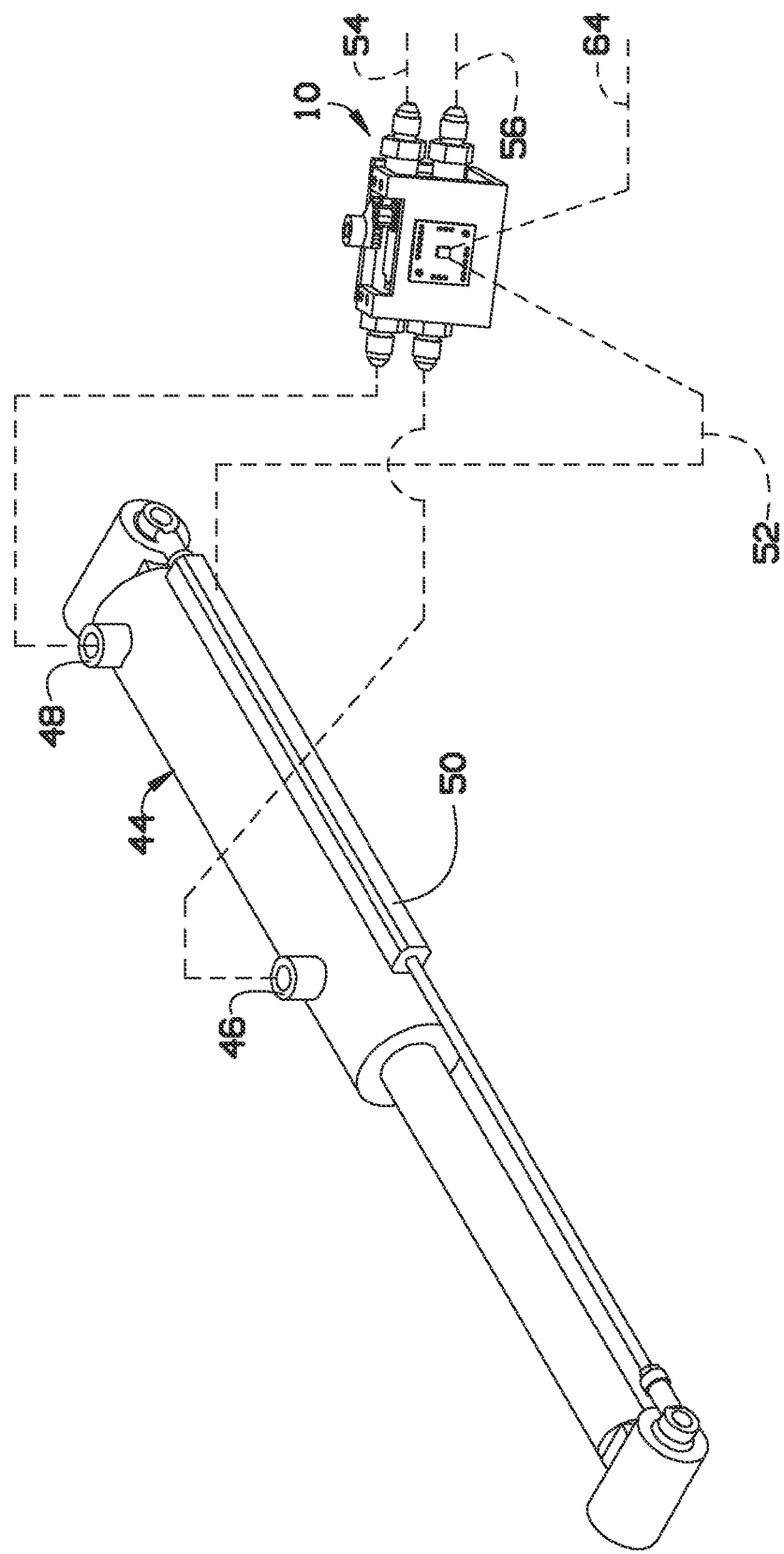
FIG. 21 is a schematic perspective view of the system embodiment of FIG. 1 shown in electrical and fluid connection with an example of a hydraulic cylinder employing a linear detection sensor, such as a linear-potentiometer, by example.

Regardless of how the valve plug 22 moves within valve plug bore 38, the holes 16 are brought into and out of alignment with ports to control the flow of fluid through the valve body ports 24 in a manner that permits, at least in one application, the actuation of a hydraulic cylinder, for example. In FIG. 6, one example of hydraulic cylinder 26 comprises a cylinder housing 44 and a piston 28. With reference to FIG. 21, the position of the piston 28 relative to the cylinder housing 44 is controlled by the delivery of fluid from the multi-port servo embodiment 10 of the present invention through valve body ports 24 to and from cylinder ports 46 and 48, where the source of fluid pressure (e.g., pump—not shown) is supplied to the valve body 10 through line 54 and returned to the source of fluid pressure through line 56, both connected to the other set of valve body ports 24.

Referring back to FIG. 3, the valve body 34 comprises valve port bores 36 into which valve ports 24 may be affixed (in one of numerous possible mechanical and/or adhesive connections), depending upon the material chosen for the valve ports 24 and the valve body 34. In a high-pressure hydraulic fluid system, the valve body 34 and the valve ports 24 are both made of high strength metals capable of withstanding the high pressures associated with the control of hydraulic cylinders. As may be appreciated, the valve plug 22 comprises a generally cylindrical configuration that may include parallel surfaces and/or tapered surfaces between holes 16, or a single or plurality of grooves along the axial length. The grooves may provide functional value of being aligned within internal collars within the valve plug bore, in some examples, or may simply reflect the addition of material around the holes for enhanced structural integrity to withstand high pressure flows.

With reference to FIGS. 4 and 5, one example of a series of fluid pathways within the valve body housing 34 may be described, where the fluid pathways permit fluid communication between the valve ports 24 through holes 16 of valve plug 22. In one embodiment of the multi-port valve body, the port bores comprise one bore 40 connected to one cylinder port 48 and another valve body port bore 42 connected to cylinder port 46. Likewise, valve body port 58 is connected to the fluid delivery line 54 from the pressure source while valve body port 60 is connected to the fluid return line 56 to the pressure source. The internal pathways within the valve body housing 34, combined with the controlled movement of the valve plug 22 within valve plug bore 38—and the concommittant alignment of holes 16 with radial ports of the valve plug bore—permit the controlled direction of fluid from fluid delivery port 58 to either cylinder ports 40 or 42 for the alternating control of piston movement in one linear direction or the other. In the example of multi-port valve body system shown here, a plurality of bores generally aligned parallel to the valve plug bore 38 are in respective communication with a port in each of the delivery and return ports 58 and 60, on the one hand, and a set of valve plug bore ports, on the other hand.

Figure 11:
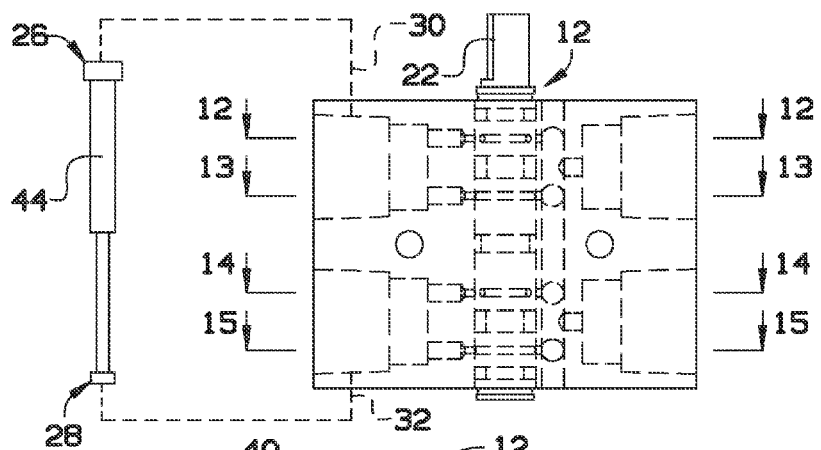
Figure 12:
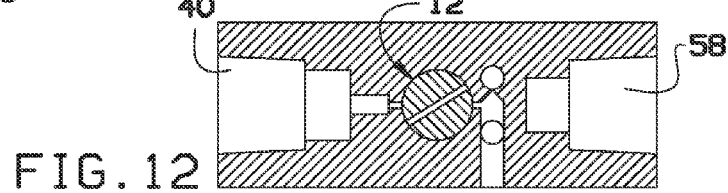
Figure 13:
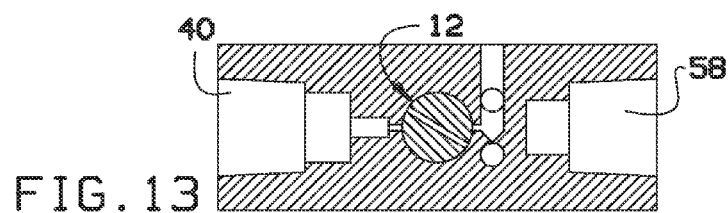
Figure 14:
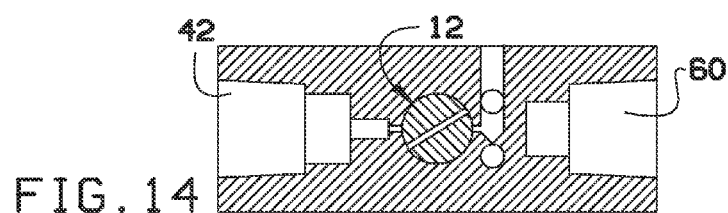
Figure 15:
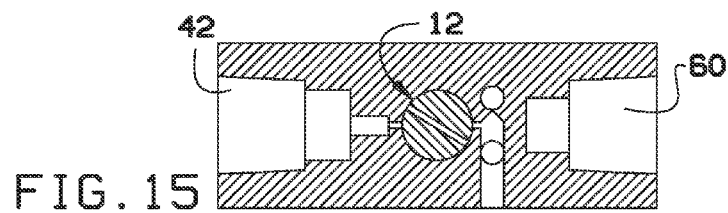
Figure 16:
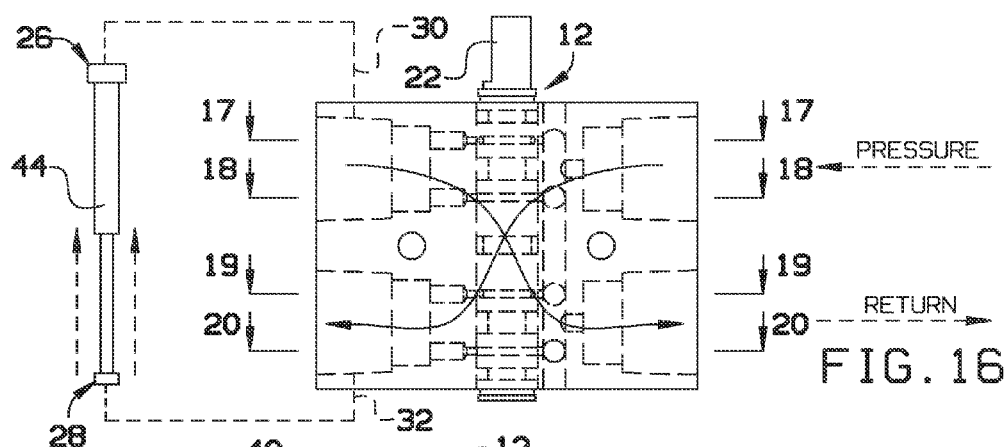
Figure 17:
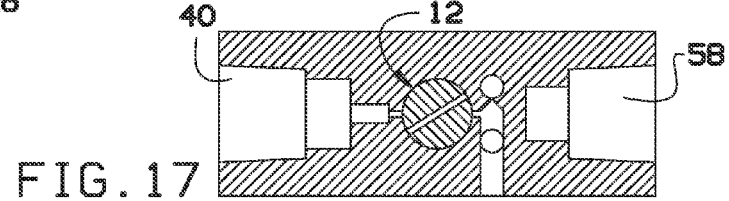
Figure 18:
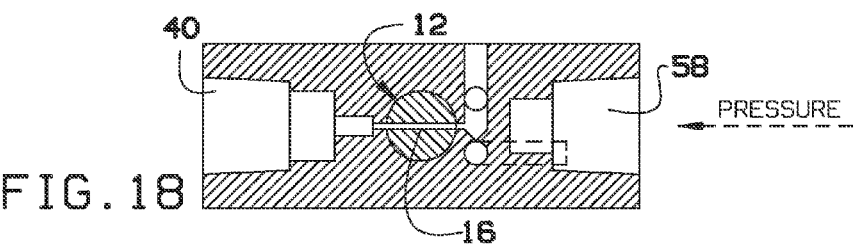
Figure 19:
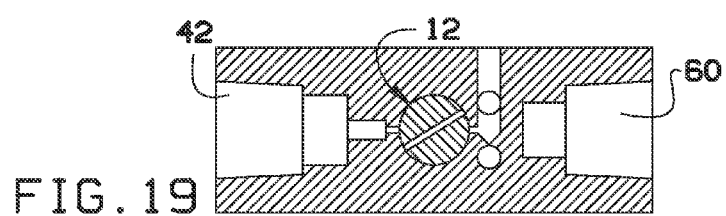
Figure 20:
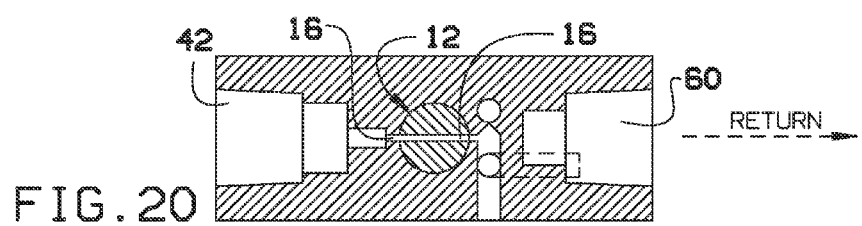

Referring to FIGS. 6 though 20, the sequence of operation may be appreciated, where the relative position of the valve plug 22 (and holes 16) within the valve plug bore 38 is shown in three different positions: a first valve open position (shown in FIGS. 6 through 10), a closed position (shown in FIGS. 11-15), and a second valve open position (shown in FIGS. 16-20). Each cross-section view associated with schematic FIGS. 6, 11 and 16 show the relative position of each of the holes 16 relative to a corresponding valve plug bore port. For example, in FIG. 7, the upper most hole is shown in fluid communication with cylinder port 40, while the second hole from the bottom is in in fluid communication with cylinder port 42, as shown in FIG. 9. Meanwhile, the second hole from the top and the bottom most hole are not in fluid communication with any port. The result, as shown in FIGS. 6 and 21, is that the fluid delivery line 54 permits fluid to flow through valve body port 58 directly to valve body port 40 and then to cylinder port 48, with the return of fluid coming from cylinder port 46 through valve body port 42 through to valve body port 60 and back to the pressure source.

With reference to FIGS. 11 through 15, the position of valve plug 22 within valve plug bore 38 is such that none of the valve plug holes 16 are in fluid communication with any ports. Thus, the valve is essentially closed and no flow is occurring between the pressure source, the valve body and the hydraulic cylinder. It should be noted that the static pressure may be such that overtime, the pressure may cause undue stress on one or more of the components. Thus, it may be desireable to include within the system a pressure-relief valve to permit the exhaust of at least some of the fluid to a sink or simply to the ambient to temporarily reduce the pressure until the valve is turned back on to the first or second valve open positions.

Referring to FIGS. 16 through 20, relative position of the valve plug 22 and the valve plug bore 38 is shown. There, the valve plug holes 16 are aligned such that resultant flow path is shown by the arrows in FIG. 16 to reflect the flow of fluid from delivery line 54 to valve body port 58 directly to valve body port 42 and then to cylinder port 46, with the return of fluid coming from cylinder port 48 through valve body port 40 through to valve body port 60 and back to the pressure source. This alternating "second" valve open position directs the piston in the opposite linear direction as results when the valve is in the "first" valve open position. Thus, reciprocating piston movement may be controlled within the hydraulic cylinder 44 to accomplish the task desired. Importantly, it should be noted that the orientation of the fluid paths and ports within the valve body example illustrated and described herein may be varied considerably and still achieve the desired fluid dynamic result.

Referring back to FIGS. 1 and 2, as well as FIG. 21, the automated control feature of embodiments of the present invention may be described. In that regard, embodiments of the multi-port servo valve system comprises a control circuit assembly 62 that may be affixed directly to the valve housing 34 or simply electrically connected to the valve housing in one form of the other, either wired or wirelessly. Preferably, the circuit assembly 62 comprises a controller 64 that may be programmed to designate the desired linear position of piston 28 within the cylinder housing 44 over time. In that regard, a sensor 50 is provided in association with the hydraulic cylinder 26, either directly attached to the cylinder housing 44 or linked in some other configuration, to detect that position of the piston 28 within the housing 44 at any one moment in time. The position is continuously or periodically fed to the controller 64 so that the controller may compare in real time or periodically the actual position of the piston to the desired position of the piston. The controller is electrically connected to the servo motor, either wired or wirelessly, to direct the servo motor to actuate the valve when necessary. If the controller's programmed comparative function reveals that there is a delta between the actual and desired piston position, the servo motor may be directed to move the valve plug in one direction or the other; i.e., to a first open or second open position, to adjust the piston position accordingly. If there is no delta detected, the valve may be either actuated to a closed position or left in a closed position, depending upon where the sequence of operation is at. In one example of a sensor 50, a linear-potentiometer may be employed. Other sensors may be employed as well to provide meaningful information about the present situation of the cylinder 26 vis-à-vis the desired situation dictated by the program entered into the controller.

Indeed, other applications are possible for the inventive embodiments of the multi-port servo valve, as described herein. For example, instead of controlling the flow of hydraulic fluid to a linear piston-style hydraulic cylinder through the use of linear position feedback, the embodiments may be employed to control the movement of a rotational cylinder, where rotational movement of a rotor in one direction or the other may be controlled through the delivery and return of pressurized fluid through embodiments of the multi-port servo valve. One example of a rotational cylinder might be a hydraulic motor configured so that the rotor rotates in a single direction, but at varying speeds and/or for varying time periods. One type of feedback sensor may be one that is configured to detect the rotational position of the rotor within its housing, or the angular velocity at any point in time.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A system comprising:
   a hydraulically-driven actuator having one of a rotor or a linear piston, and ports for hydraulic fluid to move the rotor or linear piston in either of two directions to different positions;
   an electro-mechanical sensor enabled to sense position of the rotor or linear piston;
   a valve having a valve body with a cylindrical bore of a first diameter having a central axis, the valve comprising a plug having one or more solid cylindrical portions of the first diameter engaged rotatably in the bore, individual ones of the solid cylindrical portions having one or more cross bores at right angles to an axis of the plug and through the cylindrical portion with openings at opposite ends of the cross bores, the openings at opposite ends of the cross bores aligning with openings of passages within the valve body communicating with individual ones of a plurality of inlet and outlet ports to and from the valve body, depending on relative position of the plug in the bore of the valve body;
   a servo motor coupled mechanically to the plug in a manner to rotate the plug around the central axis to different positions to align the openings of individual ones of the cross bores with the openings of individual ones of the passages in the valve body communicating with individual ones of the ports; and
   a programmable controller coupled to the electro-mechanical sensor and to the servo motor, the controller enabled to control the servo motor to accomplish programmed movement and position of the rotor or linear piston of the hydraulically-driven actuator.

2. The system of claim 1 wherein the hydraulically-driven actuator is a linear cylinder, and the electro-mechanical sensor comprises a linear-potentiometer enabled to detect linear position of a piston within the linear cylinder.

3. The system of claim 2 wherein the programmable controller is enabled to determine velocity and acceleration of the piston from position information and passage of time.

4. The system of claim 1 wherein the hydraulically-driven actuator is a rotary hydraulic motor, and the electro-mechanical sensor comprises a detector enabled to detect radial position of a driven rotor within the hydraulic motor.

5. The system of claim 4 wherein the programmable controller is enabled to determine velocity and acceleration of the rotor from position information and passage of time.

6. The system of claim 1 wherein the servo motor is coupled to the cylindrical plug by first mechanisms to rotate the plug around the axis to different positions to align individual ones of the cross bores with individual ones of the passages communicating with individual ones of the ports.

7. The system of claim 1 wherein the servo motor is coupled to the plug by second mechanisms that rotate the plug around the axis to different rotary positions and also move the plug to different linear positions along the axis of the plug to align individual ones of the openings of the cross bores with individual ones of the openings of the passages communicating with individual ones of the ports.

8. A method for controlling movement of a hydraulically-driven actuator, comprising steps:
(a) connecting first ports of a hydraulic control valve having a valve body to second ports of a hydraulically-driven actuator having one of a rotor or a linear piston;
(b) providing an electro-mechanical sensor enabled to sense position of the rotor or linear piston;
(c) moving a plug having a central axis and one or more solid cylindrical portions of a common first diameter and cross-bores through one or more of the solid cylindrical portions at right angles to the axis with openings at opposite ends of the cross bores, by a servo motor coupled to the plug, rotationally around the axis in a bore of the common first diameter in the valve body, to align individual ones of the openings of the cross bores with individual ones of openings of passages communicating with individual ones of inlet and outlet ports to and from the valve body, depending on relative position of the plug in the bore of the valve body;
(d) sensing positions of the rotor or linear piston by the electro-mechanical sensor and transmitting the position information to a programmable controller coupled to the servo motor and to the electro-mechanical sensor; and
(e) controlling the servo motor to accomplish programmed movement of the rotor or linear piston of the hydraulically-driven actuator.

9. The method of claim 8 wherein the hydraulically-driven actuator is a linear cylinder, and the electro-mechanical sensor comprises a linear-potentiometer enabled to detect linear position of a piston within the linear cylinder.

10. The method of claim 9 wherein the programmable controller is enabled to determine velocity and acceleration of the piston from position information and passage of time.

11. The method of claim 8 wherein the hydraulically-driven actuator is a rotary hydraulic motor, and the electro-mechanical sensor comprises a detector enabled to detect radial position of a driven rotor within the hydraulic motor.

12. The method of claim 11 wherein the programmable controller is enabled to determine velocity and acceleration of the rotor from position information and passage of time.

13. The method of claim 8 wherein the servo motor is coupled to the cylindrical plug by first mechanisms to rotate the plug around the axis to different positions to align individual ones of the openings of the cross bores with individual ones of the openings of the passages communicating with individual ones of the ports.

14. The method of claim 8 wherein the servo motor is coupled to the cylindrical plug by second mechanisms that rotate the plug around the axis to different rotary positions and also move the plug to different linear positions along the axis of the plug to align individual ones of the openings of the cross bores with individual ones of the openings of passages communicating with individual ones of the ports.

* * * * *